(12) United States Patent
Yim et al.

(10) Patent No.: US 10,568,480 B2
(45) Date of Patent: Feb. 25, 2020

(54) ROBOT CLEANER

(71) Applicant: LG ELECTRONICS INC., Seoul (KR)

(72) Inventors: Byungdoo Yim, Seoul (KR); Inbo Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 15/903,786

(22) Filed: Feb. 23, 2018

(65) Prior Publication Data

US 2018/0263447 A1    Sep. 20, 2018

(30) Foreign Application Priority Data

Mar. 17, 2017    (KR) .......................... 10-2017-0034026

(51) Int. Cl.
  *A47L 9/28*     (2006.01)
  *G05D 1/02*    (2006.01)
  *A47L 11/40*   (2006.01)

(52) U.S. Cl.
  CPC .......... *A47L 9/2826* (2013.01); *A47L 11/4011* (2013.01); *G05D 1/0227* (2013.01); *G05D 1/0242* (2013.01); *A47L 2201/04* (2013.01); *G05D 2201/0215* (2013.01)

(58) Field of Classification Search
  CPC ............... A47L 9/2826; A47L 11/4011; A47L 2201/04; A47L 9/0477; A47L 9/2852; G05D 1/0242; G05D 1/0227; G05D 2201/0215

USPC .................................................... 15/319, 339
See application file for complete search history.

(56) References Cited

U.S. PATENT DOCUMENTS

| | | |
|---|---|---|
| 2007/0017061 A1 | 1/2007 | Yan |
| 2015/0134179 A1 | 5/2015 | Murakami et al. |
| 2015/0245754 A1 | 9/2015 | Jang et al. |
| 2018/0206687 A1 | 7/2018 | Kim et al. |

FOREIGN PATENT DOCUMENTS

| | | |
|---|---|---|
| JP | 2847929 | 1/1999 |
| KR | 10-1541269 | 8/2015 |
| KR | 10-2015-0102365 | 9/2015 |
| KR | 10-2016-0054567 | 5/2016 |
| TW | 201343127 | 11/2013 |
| TW | 201703716 | 2/2017 |

OTHER PUBLICATIONS

PCT International Search Report dated Mar. 29, 2018 issued in International Application No. PCT/KR2018/000241.
Taiwanese Office Action (with English translation) dated Mar. 18, 2019 issued in TW Application No. 107106422.

*Primary Examiner* — David Redding
(74) *Attorney, Agent, or Firm* — Ked & Associates, LLP

(57) ABSTRACT

A robot cleaner comprises: a cleaner body including a controller, and driving wheels having their driving controlled by the controller; a bumper mounted to a bumper mounting portion formed on a front surface of the cleaner body, and configured to be inward moveable by an external force; and a cliff sensor mounted in an opening downward open at a bottom part of the cleaner body, and configured to sense a lower side terrain, wherein the bumper is provided to cover the cliff sensor in a state that the bumper has been inward moved by an external force.

20 Claims, 8 Drawing Sheets

ROBOT CLEANER

CROSS-REFERENCE TO RELATED APPLICATION

This application claims priority under 35 U.S.C. § 119 to Korean Application No. 10-2017-0034026, filed on Mar. 17, 2017, whose entire disclosure is hereby incorporated by reference.

BACKGROUND

1. Field

This specification relates to a robot cleaner having a collision sensor for sensing a collision with an obstacle, and a cliff sensor for sensing a lower side terrain.

2. Background

Generally, a robot has been developed for an industrial use, and has managed a part of factory automation. As the robot is applied to various fields recently, not only medical robots and space robots, but also home robots are being developed.

A representative of the home robot is a robot cleaner. The robot cleaner performs a vacuum cleaning function to suck dust and foreign materials on a floor while autonomously moving on a predetermined region, or performs a cleaning function using a mop. Such a robot cleaner may perform a cleaning while autonomously moving, with a chargeable battery and an obstacle sensor for avoiding an obstacle while moving.

In some cases, the robot cleaner may collide with an obstacle while moving. In order to sense a collision with an obstacle, a cleaner body of the robot cleaner is provided with a bumper configured to inward move when colliding with an obstacle, and a collision sensor having a sensing means for sensing an inward movement of the bumper.

U.S. Patent Publication No. 2015/0245754 A1 (published on Sep. 3, 2015) discloses a robot cleaner having a bumper long-arranged on a front surface of a cleaner body, and having therein a sensor for sensing a collision of an obstacle with the bumper. The above reference is incorporated by reference herein where appropriate for appropriate teachings of additional or alternative details, features and/or technical background The robot cleaner is provided with a cliff sensor for sensing a lower side terrain. The cliff sensor is provided with a light emitting portion and a light receiving portion. And a controller is configured to sense a lower side terrain by measuring a time taken for light downward irradiated from the light emitting portion to be received by the light receiving portion.

The collision sensor and the cliff sensor are required to assist a driving of the robot cleaner. However, these components may cause the fabrication costs to be increased, and may cause the robot cleaner to have a large volume.

BRIEF DESCRIPTION OF THE DRAWINGS

The embodiments will be described in detail with reference to the following drawings in which like reference numerals refer to like elements, and wherein.

DETAILED DESCRIPTION

Figure 1:
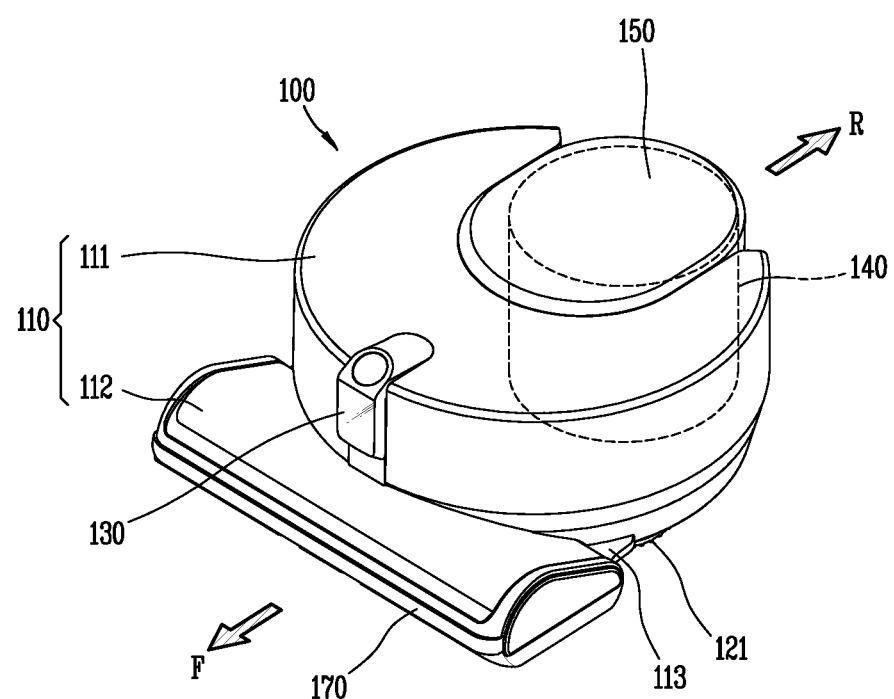
FIG. 1 is a perspective view showing an example of a robot cleaner according to the present invention.
Figure 2:
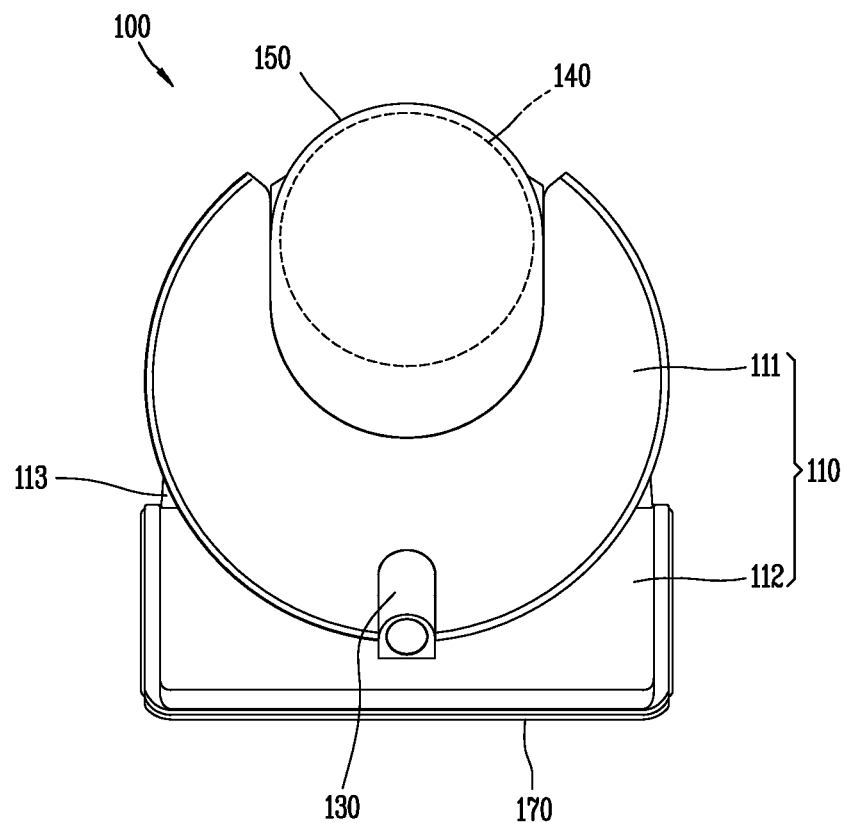
FIG. 2 is a planar view of the robot cleaner shown in FIG. 1.
Figure 3:
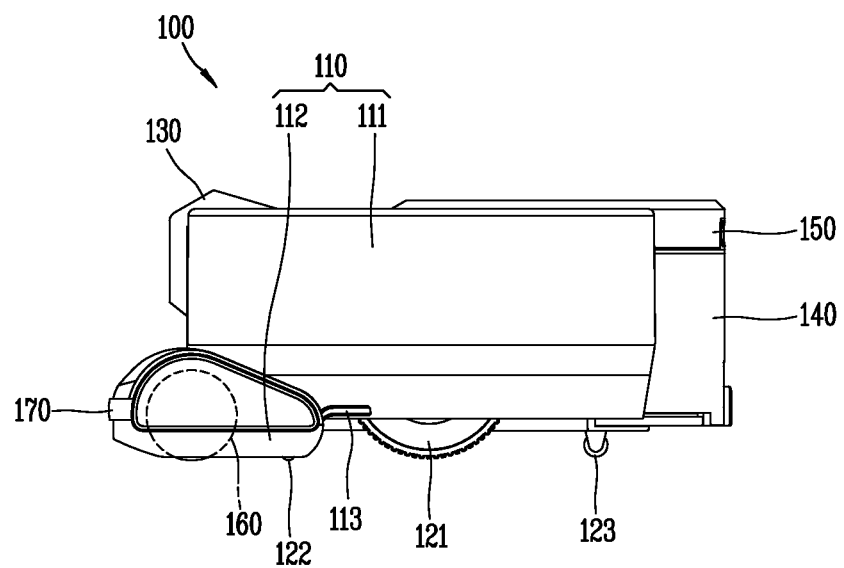
FIG. 3 is a side view of the robot cleaner shown in FIG. 1.

Hereinafter, a robot cleaner according to the present invention will be explained in more detail with reference to the attached drawings. FIG. 1 is a perspective view showing an example of a robot cleaner (or autonomous cleaner) 100 according to the present invention. FIG. 2 is a planar view of the robot cleaner 100 shown in FIG. 1, and FIG. 3 is a side view of the robot cleaner 100 shown in FIG. 1. Referring to FIGS. 1 to 3, the robot cleaner 100 performs a function to clean a floor while autonomously moving on a predetermined region. The function to clean a floor includes a function to suck dust or foreign materials on a floor, or a function to mop a floor. In this embodiment, the robot cleaner 100 is configured to perform a vacuum cleaning function to suck air above a floor and to separate dust and foreign materials from the sucked air for collection, while autonomously moving on a predetermined region.

The robot cleaner 100 includes a cleaner body 110, driving wheels 121 and a battery (not shown). The cleaner body 110 forms an appearance of the robot cleaner 100. The cleaner body 110 includes a controller for controlling the robot cleaner 100, and is provided therein with various types of components.

In this drawing, the cleaner body 110 includes a first housing 111, and a second housing 112 provided at one side of the first housing 111. The one side may be a side that the cleaner body 110 moves in a forward direction (F), i.e., a front side of the first housing 111.

A circuit board (not shown) which constitutes the controller is provided at the first housing 111. And a module mounting housing 112f for detachably mounting various types of modules (e.g., a brush module (or roller) 160 or a mop module (not shown) is provided at the second housing 112. The first and second housings 111, 112 may be respectively referred to as a main housing and a module mounting housing, according to their functions.

The driving wheels 121, rotated by receiving a driving force from a driving motor (not shown), is provided at the cleaner body 110. The driving motor may have its driving controlled by the controller. The driving wheels 121 may be provided at right and left sides of the first housing 111, and the driving motor may be connected to each of the driving wheels 121 for an independent driving of each of the driving wheels 121. The cleaner body 110 may be moved or rotated back and forth or right and left, by the driving wheels 121.

The cleaner body 110 may be further provided with auxiliary wheels 122, 123. The auxiliary wheels 122, 123 are differentiated from the driving wheels 121 in that they have only a rolling function on a floor. The auxiliary wheels 122, 123 are configured to support the cleaner body 110 together with the driving wheels 121, and to assist a driving of the cleaner body 110 by the driving wheels 121.

As shown, if the second housing 112 is provided at one side of the first housing 111, the auxiliary wheel 122 may be provided at the second housing 112 for a stable driving of the cleaner body 110. Alternatively, the auxiliary wheel 123 may be provided at another side of the first housing 111.

A battery (not shown) for supplying a power to the robot cleaner 100 is mounted to the cleaner body 110. The battery is formed to be chargeable, and may be formed to be detachable from a bottom surface of the first housing 111.

As shown, as the quadrangular second housing 112 is provided at one side of the circular first housing 111, an inward dented space may be formed between the first and second housings 111, 112. If an obstacle is provided at the space, the robot cleaner 100 may not be moved in a fitted state into the obstacle.

For prevention of this, a cover member 113 may be provided to cover at least part of the space. The cover member 113 may be provided at the first housing 111 or the second housing 112. In this embodiment, the cover members 113 are protruded from both sides of a rear end of the second housing 112, thereby covering an outer circumferential surface of the first housing 111.

The cover member 113 is provided to cover at least part of the space. This may implement a structure where an obstacle is prevented from being provided at the space, or a structure where the robot cleaner easily moves out of an obstacle provided at the space.

The cover member 113 protruded from the second housing 112 may be supported on an outer circumferential surface of the first housing 111. If the cover member 113 is protruded from the first housing 111, the cover member 113 may be supported on a rear surface of the second housing 112. Under such a structure, if the second housing 112 receives an impact by colliding with an obstacle, a part of the impact may be transferred to the first housing 111 to thus be dispersed.

The second housing 112 may be coupled to the first housing 111 in a detachable manner. When the second housing 112 is coupled to the first housing 111, the mounting may be guided by the aforementioned cover member 113. That is, since the cover member 113 is provided to cover the outer circumferential surface of the first housing 111, a relative position of the second housing 112 with respect to the first housing 111 may be determined.

A sensing unit 130 is provided at the first housing 111. As shown, the sensing unit 130 may be provided at one side of the first housing 111 where the second housing 112 is positioned, i.e., at a front side of the first housing 111.

The sensing unit 130 may be provided to be overlapped with the second housing 112 in an up-down direction of the first housing 111. The sensing unit 130 is provided above the second housing 112. And the sensing unit 130 is configured to sense a front obstacle or terrain feature, in order to prevent the second housing 112 positioned at a foremost side of the robot cleaner 100, from colliding with the obstacle.

If the robot cleaner 100 is configured to perform a vacuum cleaning function, air including dust and foreign materials is sucked through an opening 112a (refer to FIG. 6) formed at a bottom part of the second housing 112. And a brush module 160 for brushing dust and foreign materials on a floor may be mounted to the opening 112a.

If the brush module 160 is separated from the second housing 112, a mop module (not shown) may be detachably coupled to the second housing 112 instead of the separated brush module 160. The mop module may be mounted to the module mounting housing 112f, and the module mounting housing 112f may be detachably coupled to the opening 112a. Thus, a user may selectively mount the brush module 160 or the mop module to the second housing 112 according to a cleaning purpose.

The controller may recognize a module mounted to the second housing 112, and may perform an operation corresponding to the module. For instance, if the brush module 160 is mounted to the second housing 112, the controller may operate a motor and a fan to generate a suction force for sucking air above a floor. And the controller may operate a rotation driving unit (not shown) such that the brush module 160 connected to the rotation driving unit may brush dust and foreign materials on a floor.

If the mop module is mounted to the second housing 112, the controller may operate the rotation driving unit. As the rotation driving unit is operated, the mop module connected to the rotation driving unit is rotated to clean a floor. The controller is configured not to operate the motor and the fan in a mounted state of the mop module to the second housing 112.

Dust and foreign materials included in air sucked through the brush module 160 are filtered to be collected at a dust container 140. And the air having dust and foreign materials separated therefrom is discharged to outside of the first housing 111. An air suction passage (not shown) for guiding air introduced through the opening 112a to the dust container 140, and an air discharge passage (not shown) for guiding air from the dust container 140 to outside of the first housing 111 may be formed in the first housing 111.

A dust container accommodation portion is provided at the first housing 111, and the dust container 140 for collecting dust separated from sucked air is detachably coupled to the dust container accommodation portion. As shown, the dust container accommodation portion may be formed at another side of the first housing 111, i.e., at a rear side of the first housing 111. The dust container accommodation portion may have a shape open towards a rear side of the first housing 111, and may be recessed towards a front side from a rear side of the first housing 111.

One part of the dust container 140 is accommodated in the dust container accommodation portion, and another part of the dust container 140 may be protruded towards a rear side of the first housing 111 (i.e., a reverse direction (R) opposite to a forward direction (F)). At least one of a filter for filtering dust and foreign materials from sucked air and a cyclone may be provided at the dust container 140.

The robot cleaner 100 may be provided with a dust container cover 150 for covering the dust container 140. When the dust container cover 150 is provided to cover an upper surface of the dust container 140, the dust container 140 may be prevented from being separated from the first housing 111 by the dust container cover 150.

In the drawings, the dust container cover 150 is formed to be rotatable by being hinge-coupled to the first housing 111. The dust container cover 150 may maintain a state to cover an upper surface of the dust container 140, by being fixed to the dust container 140 or the first housing 111.

Figure 4:
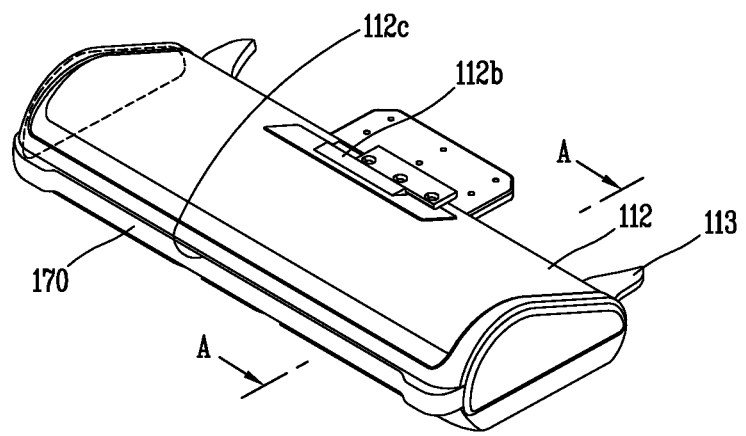
FIG. 4 is a disassembled perspective view of a second housing in the robot cleaner shown in FIG. 1.
Figure 5:
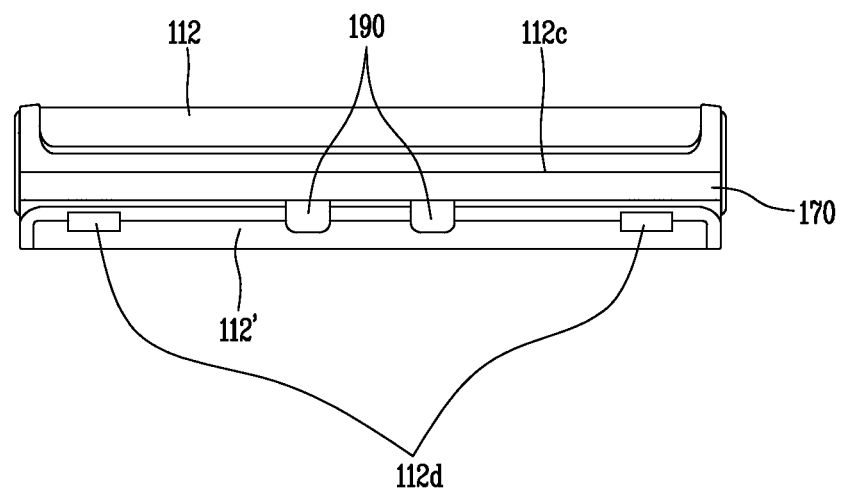
FIG. 5 is a frontal view of the second housing shown in FIG. 4.
Figure 6:
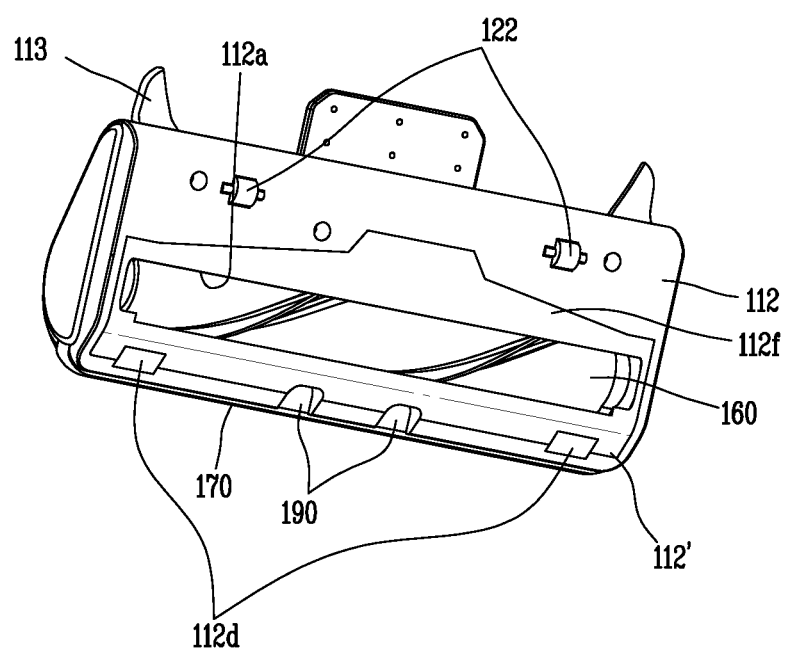
FIG. 6 is a view showing a bottom part of the second housing shown in FIG. 4.

FIG. 4 is a disassembled perspective view of the second housing 112 in the robot cleaner 100 shown in FIG. 1, and FIG. 5 is a frontal view of the second housing 112 shown in FIG. 4. And FIG. 6 is a view showing a bottom part of the second housing 112 shown in FIG. 4.

The second housing 112 may be long-extended in one direction. As shown, the second housing 112 may be long-extended in right and left directions of the first housing 111.

The opening 112a is formed at a bottom part of the second housing 112. As aforementioned, the brush module 160 or the mop module may be detachably coupled to the opening 112a.

If the robot cleaner 100 is configured to perform a vacuum cleaning function, air including dust and foreign materials is sucked into the second housing 112 through the opening 112a. The opening 112a is communicated with a communication portion 112b. When the second housing 112 is coupled to the first housing 111, the communication portion 112b is communicated with the air suction passage inside the first housing 111.

An inclination surface 112' upward inclined with respect to a bottom surface of the second housing 112 may be formed at a front end of a bottom side of the second housing 112. The cleaner body 110 may easily climb a low threshold or an obstacle by the inclination surface 112'.

If the second housing 112 is provided at a front side of the first housing 111, the second housing 112 forms a front circumference of the cleaner body 110. Thus, if the cleaner body 110 collides with an obstacle while moving, the collision mainly occurs at the second housing 112, especially, a front surface of the second housing 112.

Considering this, a collision sensor for sensing a collision with an obstacle is installed at the second housing 112. The collision sensor is configured to sense a collision with an obstacle, the collision occurring at a front surface of the second housing 112. The collision sensor will be explained later in more detail.

When the robot cleaner 100 which is moving in a forward direction (F) approaches a drastically-lowered stair-stepped portion, a cliff, etc., the robot cleaner is required to perform an avoidance operation. If sensing and coping with such a situation are not properly performed, the robot cleaner 100 may damage the stair-stepped portion by dropping or may not climb the stair-stepped portion again.

For this, a cliff sensor 180 for sensing a lower side terrain is provided at a front end of a bottom side of the second housing 112. The cliff sensor 180 is electrically connected to a circuit board which constitutes the controller. The cliff sensor 180 may be provided at the inclination surface 112'.

The cliff sensor 180 may be also provided at a bottom part of the first housing 111. Considering the function of the cliff sensor 180, the cliff sensor 180 provided at the first housing 111 is preferably provided at a rear side of the first housing 111 in an adjacent manner.

Since the robot cleaner 100 is wirelessly operated, it is required to charge a battery provided at the cleaner body 110 while the robot cleaner is being used. For charging of the battery, a charging station (not shown) is provided as a power supply unit. And a charging terminal 190 formed to be connectable to the charging station is provided at the second housing 112.

In the drawings, the charging terminal 190 is provided at the aforementioned inclination surface 112' of the second housing 112, thereby being exposed to the front side. The charging terminal 190 may be provided between the cliff sensors 180 provided at both sides of the second housing 112.

As aforementioned, in a case that the second housing 112 is provided at one side of the first housing 111, if the sensing unit 130 is not provided at the second housing 112, a probability for the robot cleaner to collide with an obstacle is increased. The sensing unit 130 provided at the first housing 111 senses an obstacle provided in front of the second housing 112. However, when there is an obstacle at a blind spot which cannot be sensed by the sensing unit 130, or when an obstacle appears suddenly, the robot cleaner 100 may collide with the obstacle.

In case of such a collision, the robot cleaner should be spaced apart from the obstacle by backward moving, or by converting a direction. For this, such a collision with an obstacle should be sensed firstly.

Figure 7:
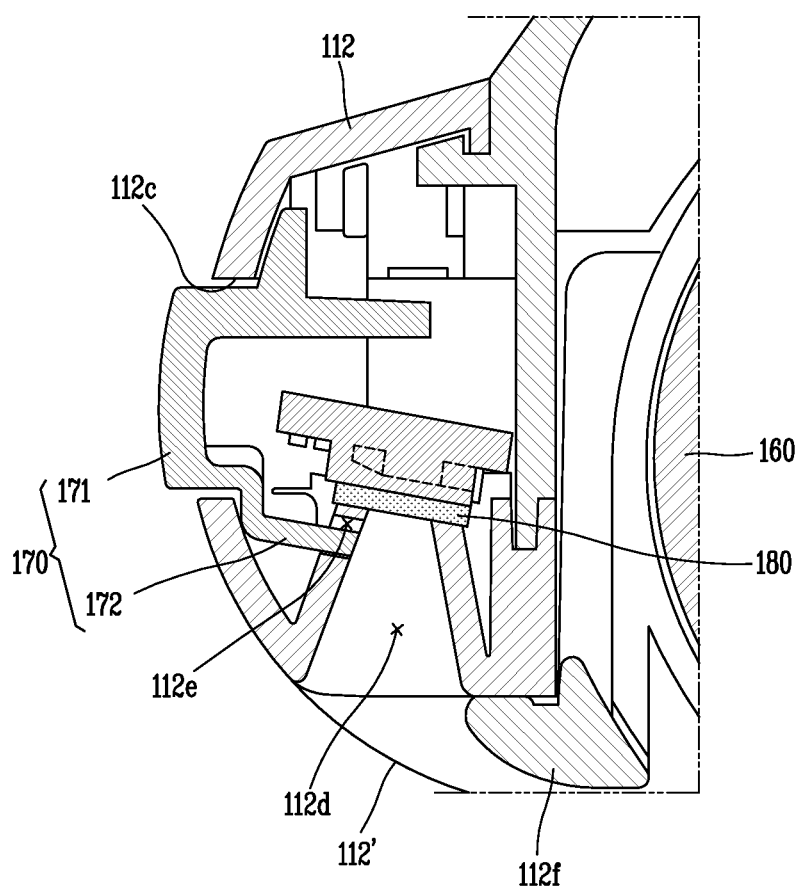
FIG. 7 is a sectional view taken along line 'A-A' in FIG. 4.
Figure 8:
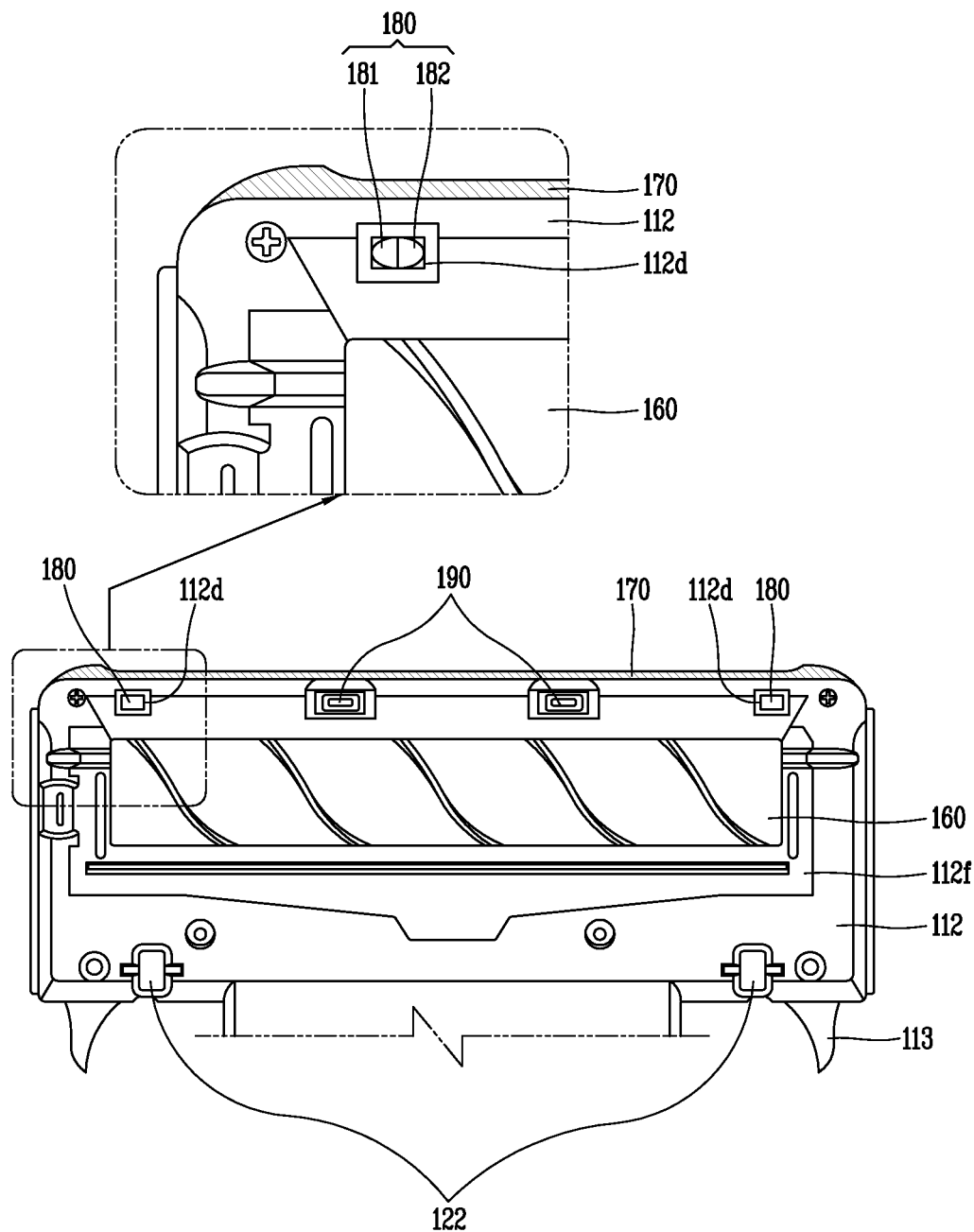
FIG. 8 is a bottom view of the second housing in the illustrated state in FIG. 7.

Hereinafter, the collision sensor for sensing a collision with an obstacle will be explained in more detail. FIG. 7 is a sectional view taken along line 'A-A' in FIG. 4, and FIG. 8 is a bottom view of the second housing 112 in the illustrated state in FIG. 7. Referring to FIGS. 7 and 8, an opening (or recess) 112d which is downward open is provided at a bottom part of the second housing 112. The opening 112d may be formed to be gradually widened in a downward direction.

The opening 112d may be formed at a front side of the brush module 160 or the mop module mounted to the second housing 112. The opening 112d may be formed at the inclination surface 112' formed at a front end of a bottom side of the second housing 112.

The cliff sensor 180 for sensing a lower side terrain is provided in the opening 112d. As shown in FIG. 8, the cliff sensor 180 is exposed to a lower side of the second housing 112 through the opening 112d. The cliff sensor 180 includes a light emitting portion 181 for irradiating light to a lower side of the opening 112d (e.g., infrared rays), and a light receiving portion 182 for receiving reflected light.

The controller is configured to calculate a distance between the cliff sensor 180 and a floor, by measuring a time taken for light downward irradiated from the light emitting portion 181 through the opening 112d, to be received by the light receiving portion 182. Thus, if there is a drastically-lowered stair-stepped portion at a front side, a time to receive reflected light is drastically increased. And if there is a cliff at a front side, reflected light is not received by the light receiving portion 182.

As shown, the cliff sensor 180 may be provided to be inclined from a bottom surface of the second housing 112, such that the light emitting portion 181 may irradiate light towards a front floor. With such a configuration, there is an aspect that a terrain on a front lower side of the second housing 112 is sensed by using the cliff sensor 180. And there is an aspect that the robot cleaner can avoid an obstacle by more rapidly sensing a terrain feature on an expected path of the second housing 112. Alternatively, the cliff sensor 180 may be provided to be perpendicular to the bottom surface of the second housing 112, such that the light emitting portion 181 may perpendicularly irradiate light to a floor on which the second housing 112 is supported.

If it is sensed by the cliff sensor 180 that a lower side terrain is lowered by more than a predetermined degree, the controller changes a control of the driving wheels 121 into a preset manner. For instance, the controller may apply a driving force to one of the driving wheels 121 such that the robot cleaner 100 may be rotated. Alternatively, the controller may apply a driving force to both of the driving wheels 121 in different directions. Alternatively, the controller may apply a driving force to the driving wheels 121 in the reverse direction, such that the robot cleaner 100 may move backward.

The second housing 112 is provided with a collision sensor for sensing a physical collision with an obstacle. The collision sensor includes a bumper 170 and the aforementioned cliff sensor 180. The bumper 170 is provided at a front surface of the second housing 112. The bumper 170 is long-extended in right and left directions of the second housing 112. A bumper mounting portion (or cavity) 112c for accommodating the bumper 170 therein is formed at the second housing 112. The bumper mounting portion 112c may have a shape corresponding to the bumper 170.

The bumper 170 is mounted to the bumper mounting portion 112c, and a part of the bumper 170 is forward protruded from a front surface of the second housing 112 in a state that no external force is applied. The bumper 170 is configured to be pressurized by an external force (i.e., at the time of colliding with an obstacle) to thus be moveable to inside of the bumper mounting portion 112c. The bumper 170 may be formed of a material including an elastic material so as to absorb an impact when it collides with an obstacle.

If the bumper 170 becomes spaced apart from an obstacle, the bumper 170 moves toward outside of the second housing 112 (i.e., a front side of the second housing 112) so as to return to the original position where a part of the bumper 170 is forward protruded from the front surface of the second housing 112.

For such an inward/outward movement of the bumper 170, an elastic member (not shown) may be provided between the bumper 170 and the bumper mounting portion 112c. The elastic member may be configured to elastically pressurize the bumper 170 towards outside of the second housing 112, in a supported state by the bumper 170 and the bumper mounting portion 112c. The elastic member may be provided in plurality, and the plurality of elastic members may be spaced apart from each other with a preset gap therebetween in an extended direction of the bumper 170.

Alternatively, the bumper 170 may be configured to be moveable inward and outward, in an elastically supported state by the bumper mounting portion 112c. For this, an elastic support portion elastically supported by the bumper mounting portion 112c may be provided at the bumper 170. In this case, since no elastic member is required, the production costs may be reduced and the entire structure may be simplified.

The conventional robot cleaner 100 is provided with a sensing means (e.g., a micro switch, an infrared ray sensor, etc.) for sensing an inward movement of the bumper 170, in the bumper 170. However, in this case, the fabrication costs may be increased due to the sensing means, and the second housing 112 may have a large volume due to the mounting of the sensing means.

Figure 9:
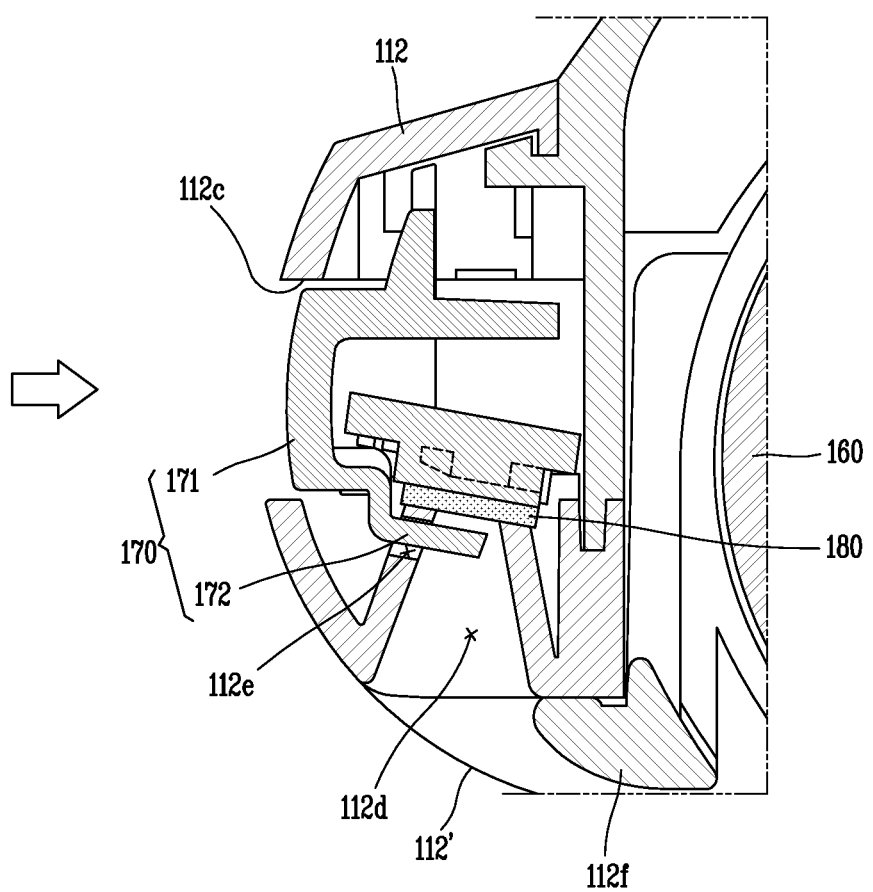
FIG. 9 is a view showing a state that a bumper shown in FIG. 7 has been inward moved by an external force.

In the present invention, the cliff sensor 180 is used as the sensing means. Hereinafter, this will be explained in more detail. FIG. 9 is a view showing a state that the bumper 170 shown in FIG. 7 has been inward moved by an external force, and FIG. 10 is a bottom view of the second housing 112 in the illustrated state in FIG. 9.

Figure 10:
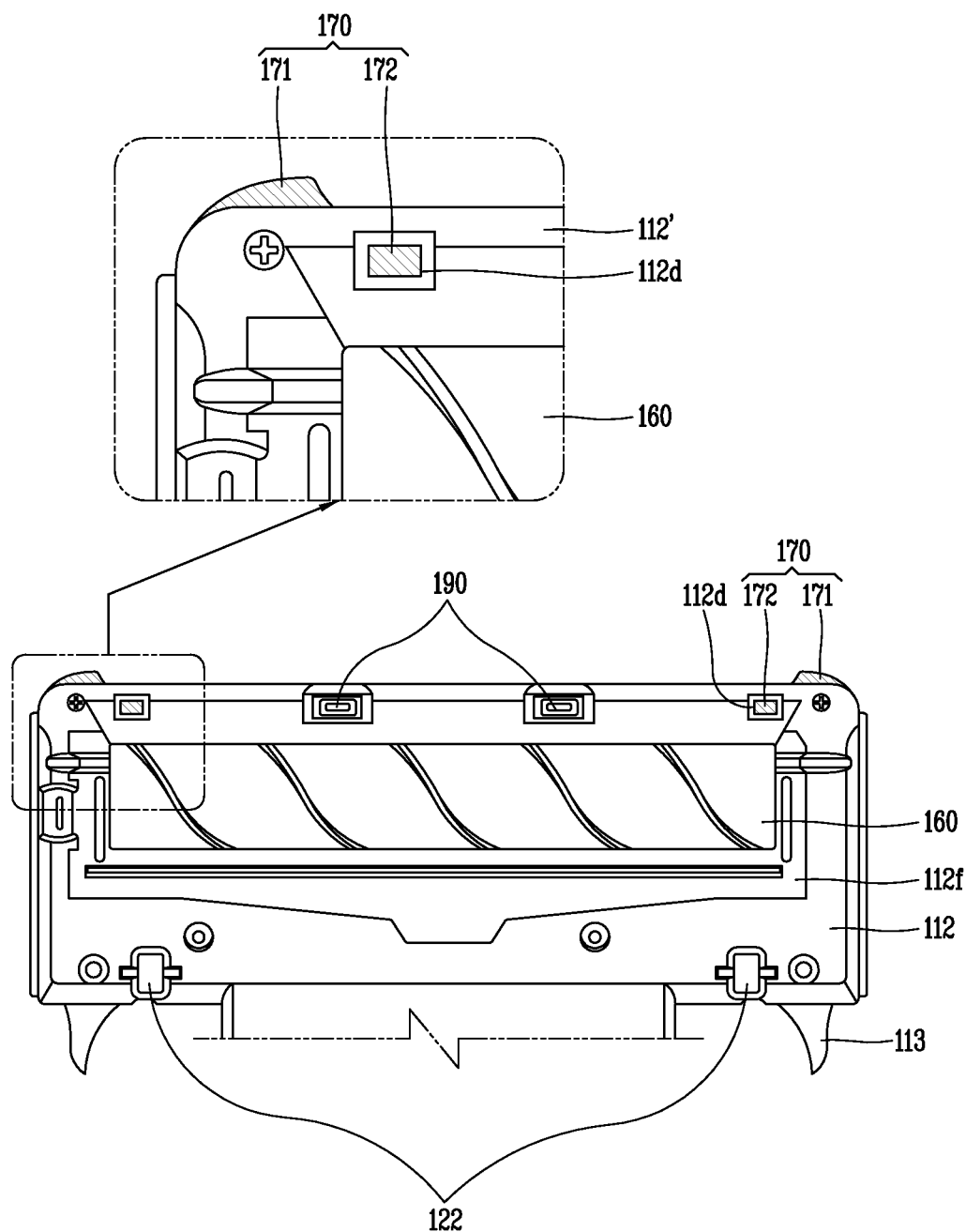
FIG. 10 is a bottom view of the second housing in the illustrated state in FIG. 9.

Referring to FIGS. 9 and 10 with FIGS. 7 and 8, in a state that the bumper 170 has been inward moved by an external force, the bumper 170 is provided to cover the cliff sensor 180. That is, as the bumper 170 is provided below the cliff sensor 180, an inward movement of the bumper 170 may be sensed by the cliff sensor 180.

The bumper 170 may be provided to penetrate the opening 112d when moved inward by an external force. For this, a through hole 112e for communicating the bumper mounting portion 112c and the opening 112d with each other is formed at the cleaner body 110 such that a part of the bumper 170 passes therethrough. The through hole 112e may be formed at a side wall which defines the opening 112d.

The bumper 170 includes a body portion (or bumper body) 171 and an extended portion (or bumper extension) 172. The body portion 171 is mounted to the bumper mounting portion 112c. The body portion 171 is configured to be inward moved when an external force is applied thereto, and to be outward moved when the external force is released. In the released state of the external force, a part of the body portion 171 is protruded from the bumper mounting portion 112c.

The extended portion 172 is backward extended from the body portion 171. The extended portion 172 is configured to be accommodated in the opening 112d by passing through the through hole 112e, in a state that the bumper 170 has been inward moved. In the state that the bumper 170 has been inward moved, the extended portion 172 may be provided below the cliff sensor 180.

As shown in FIG. 10, when the cleaner body 110 is viewed from a bottom side in the state that the bumper 170 has been inward moved, the extended portion 172 is provided to cover the cliff sensor 180. The extended portion 172 is provided to be overlapped with the cliff sensor 180, in an extended direction of the opening 112d. Thus, the cliff sensor 180 is not exposed to the outside through the opening 112d, because it is covered by the extended portion 172.

As shown in FIG. 7, in a state that the bumper 170 has not been inward moved, the extended portion 172 may be in an inserted state into the through hole 112e. The extended portion 172 is configured to guide an inward movement of the bumper 170, by being inserted into the through hole 112e.

Under the aforementioned structure, if the bumper 170 collides with an obstacle, the body portion 171 of the bumper 170 is moved towards inside of the bumper mounting portion 112c. In this case, the extended portion 172 is accommodated in the opening 112d to cover the cliff sensor 180. Thus, even if there is no change of a terrain feature below the cliff sensor 180, a time taken to receive reflected light by the light receiving portion 182 of the cliff sensor 180 when the bumper 170 collides with an obstacle is shortened.

The controller is configured to sense an inward-moved state of the bumper 170, based on the time taken to receive reflected light by the light receiving portion 182. The controller is configured to sense one of a first state, a second state, or a third state by using the cliff sensor 180. The first state means a state that the bumper 170 is provided (pushed in by an impact) to cover the cliff sensor 180. The second state means a state that a floor on which the cleaner body 110 is supported is positioned below the opening 112d. And the third state means a state that a terrain lower than a floor is formed below the opening 112d. The first state, a state not sensed by the conventional cliff sensor 180, indicates an additional sensing state due to the structure to cover the cliff sensor 180 by the aforementioned bumper 170.

The time taken to receive reflected light by the cliff sensor 180 is the shortest in the first state, and is the longest in the third state (or if there is a cliff below the cliff sensor 180, reflected light may not be received). And the time taken to receive reflected light in the second state has a value between the time taken to receive reflected light in the first state and the time taken to receive reflected light in the third state.

Thus, if a time taken to receive reflected light by the cliff sensor 180 corresponds to the time taken to receive reflected light by the cliff sensor 180 in one of the first to third states, the controller may sense that the robot cleaner is in said one state. For instance, if a time taken to receive reflected light by the cliff sensor 180 corresponds to the time taken to receive reflected light in the first state that the bumper 170 is provided to cover the cliff sensor 180, the controller may sense that the bumper 170 has been inward moved. The controller may be configured to execute a different control function according to each sensed state (e.g., based on the amount of time between transmission of light and detection of a reflection).

If the first state that the bumper 170 is provided to cover the cliff sensor 180 by being inward moved is sensed, the controller may change a control of the driving wheels 121 into a preset manner. More specifically, if an inward-moved state of the bumper 170 is sensed while the cleaner body 110 is moving in a first manner (e.g., forward movement), the controller may change the first manner into a second manner (e.g., backward movement).

The preset manner may include converting a driving direction of the driving wheels 121, or changing a rotation speed. For instance, if the cleaner body 110 is forward moving, the controller may rotate the driving wheels 121 in the reverse direction to backward move the cleaner body 110. As another example, if the cleaner body 110 is being rotated clockwise, the controller may rotate the driving wheels 121 provided at both sides of the cleaner body 110 in directions opposite to each other to rotate the cleaner body 110 counterclockwise.

If the second state that a floor on which the cleaner body 110 is supported is positioned below the opening 112*d* is sensed, the controller may maintain the control of the driving wheels 121. That is, the controller determines the second state as a normal driving state, thereby maintaining the driving of the cleaner body 110 in the same manner as the previous manner.

If the third state that a terrain lower than a floor is formed below the opening 112*d* is sensed, the controller may change the control of the driving wheels 121 into a preset manner. That is, if it is sensed that a terrain lower than a floor is formed below the opening 112*d*, while the cleaner body 110 is moving in a first manner (e.g., forward movement), the controller may change the first manner into a second manner (e.g., rotation).

The preset manner may include converting a driving direction of the driving wheels 121, or changing a rotation speed. For instance, if the cleaner body 110 is forward moving, the controller may rotate the driving wheels 121 provided at both sides of the cleaner body 110 in directions opposite to each other to rotate the cleaner body 110.

In the aforementioned present invention, when the bumper 170 collides with an obstacle, the bumper 170 is inward moved to cover the cliff sensor 180 exposed downward through the opening 112*d*. That is, the cliff sensor 180 may be used to sense an inward-moved state of the bumper 170. Thus, a sensing means needs not be additionally installed in the bumper 170. This may reduce the fabrication costs, and may reduce a volume of the robot cleaner 100.

Further, the controller distinguishes the state that the bumper 170 is provided to cover the cliff sensor 180, from the state that a terrain lower than a floor on which the cleaner body 110 is supported is formed below the opening 112*d*. And the controller controls a driving of the driving wheels 121 in a different manner. This may allow the cleaner body 110 to properly perform an obstacle avoidance operation according to each state.

In this embodiment, the cleaner body 110 includes the first and second housings 111, 112, and the cliff sensor is formed at the second housing 112 to sense an inward movement of the bumper 170. However, the present invention is not limited to this. That is, the present invention may be also applicable to a case that the cleaner body 110 includes a single housing.

Therefore, an aspect of the detailed description is to provide a robot cleaner of a more simplified structure, capable of reducing fabrication costs and having a reduced volume, with a collision sensor for sensing a collision with an obstacle and a cliff sensor for sensing a lower side terrain.

To achieve these and other aspects and in accordance with this specification, as embodied and broadly described herein, there is provided a robot cleaner, comprising: a cleaner body including a controller, and driving wheels having their driving controlled by the controller; a bumper mounted to a bumper mounting portion formed on a front surface of the cleaner body, and configured to be inward moveable by an external force; and a cliff sensor mounted in an opening downward open at a bottom part of the cleaner body, and configured to sense a lower side terrain, wherein the bumper is provided to cover the cliff sensor in a state that the bumper has been inward moved by an external force.

The cliff sensor includes: a light emitting portion configured to irradiate light to a lower side of the opening; and a light receiving portion configured to receive reflected light. The controller senses an inward-moved state of the bumper by using the cliff sensor. If the inward-moved state of the bumper is sensed, the controller changes a control of the driving wheels into a preset manner. The preset manner includes converting a driving direction of the driving wheels, or changing a rotation speed.

A through hole configured to communicate the bumper mounting portion and the opening with each other is formed at the cleaner body such that a part of the bumper passes therethrough. The through hole is formed at a side wall which defines the opening.

The bumper includes: a body portion mounted to the bumper mounting portion; and an extended portion backward extended from the body portion, and configured to be accommodated in the opening by passing through the through hole, in a state that the bumper has been inward moved. In a state that the bumper has not been inward moved, the extended portion is in an inserted state into the through hole. The opening is formed at an inclination surface upward inclined with respect to a bottom surface of the cleaner body.

The controller is configured to sense, by using the cliff sensor, one of a first state that the bumper is provided to cover the cliff sensor, a second state that a floor on which the cleaner body is supported is positioned below the opening, and a third state that a terrain lower than the floor is formed below the opening. The controller is configured to execute a different control function according to each sensed state.

To achieve these and other aspects and in accordance with the purpose of this specification, as embodied and broadly described herein, there is provided a robot cleaner, comprising: a first housing including a controller, and driving wheels having their driving controlled by the controller; a second housing provided at one side of the first housing, and configured to mount a brush module or a mop module; a bumper mounted to a bumper mounting portion formed on a front surface of the second housing, and configured to be inward moveable by an external force; and a sensor mounted in an opening which is downward open at a bottom part of the second housing, and including a light emitting portion for irradiating light to a lower side of the opening and a light receiving portion for receiving reflected light, wherein in a state that the bumper has been inward moved by an external force, a part of the bumper is accommodated in the opening by passing through a through hole for communicating the bumper mounting portion with the opening.

The controller is configured to sense the inward-moved state of the bumper, based on a time taken to receive reflected light by the light receiving portion. The opening is formed at a front side of the brush module or the mop module.

In the present invention, when the bumper collides with an obstacle, the bumper is inward moved to cover the cliff sensor exposed downward through the opening. That is, the cliff sensor may be used to sense an inward-moved state of the bumper. Thus, a sensing means needs not be additionally installed in the bumper. This may reduce the fabrication costs, and may reduce a volume of the robot cleaner.

Further, the controller distinguishes the state that the bumper is provided to cover the cliff sensor, from the state that a terrain lower than a floor on which the cleaner body is supported is formed below the opening. And the controller controls a driving of the driving wheels in a different manner. This may allow the cleaner body to properly perform an obstacle avoidance operation according to each state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autonomous cleaner, comprising:
a cleaner body including a controller, and one or more driving wheels managed by the controller;
a bumper mounted in a cavity formed on a front surface of the cleaner body, and configured to be inward moveable by an external force into the cleaner body; and
a cliff sensor mounted in a recess, having an opening in a lower region of the cleaner body, and configured to sense an attribute of terrain under the autonomous cleaner,
wherein the bumper is further configured to enter the recess to at least partially cover the cliff sensor when the bumper is moved inward by the external force.

2. The autonomous cleaner of claim 1, wherein the cliff sensor includes:
   a light emitter configured to irradiate light toward the opening of the recess; and
   a light sensor configured to detect a reflection of the light.

3. The autonomous cleaner of claim 1, wherein the controller determines that the bumper is moved inward when the cliff sensor detects a portion of the bumper in the recess.

4. The autonomous cleaner of claim 3, wherein when the controller determines that the bumper is moved inward, the controller changes a control of the driving wheels in a preset manner.

5. The autonomous cleaner of claim 4, wherein changing the control of the driving wheels in the preset manner includes at least one of changing a driving direction or a rotation speed of at least one of the driving wheels.

6. The autonomous cleaner of claim 1, wherein the cleaner body further includes a through-hole that communicates between the cavity and the recess, and wherein a part of the bumper passes through the through-hole when moved inward.

7. The autonomous cleaner of claim 6, wherein the through hole is formed at a side wall of the recess.

8. The autonomous cleaner of claim 6, wherein the bumper includes:
   a bumper body mounted to the cavity; and
   a bumper extension that extends backward from the bumper body, and a portion of the bumper extension is configured to enter the recess by passing through the through-hole when the bumper has been moved inward.

9. The autonomous cleaner of claim 8, wherein when the bumper has not been moved inward, a part of the bumper extension is inserted into the through-hole.

10. The autonomous cleaner of claim 1, wherein the opening of the recess is formed at an inclination surface that is upward inclined with respect to a bottom surface of the cleaner body.

11. The autonomous cleaner of claim 1, wherein the cliff sensor is configured to detect one of a first state in which the bumper is moved inward by the external force into the recess to at least partially cover the cliff sensor, a second state in which a floor surface supporting the cleaner body is positioned below the opening, or a third state in which terrain lower than the floor surface is below the opening.

12. The autonomous cleaner of claim 11, wherein the controller is configured to execute a different control function according to whether the first, the second, or the third state is detected.

13. A autonomous cleaner, comprising:
   a first housing including a controller, and one or more driving wheels managed by the controller;
   a second housing provided at one side of the first housing, and configured to receive a roller;
   a bumper mounted to a cavity formed on a vertical surface of the second housing, and configured move inward into the second housing when an external force is applied to the bumper; and
   a sensor mounted in a recess having an opening at a lower region of the second housing, the sensor including a light emitter to irradiate light toward the opening and a light sensor to detect a reflection of the light,
   wherein when the bumper has been moved inward by the external force, a part of the bumper extends into the recess by passing through a through-hole communicating between the cavity and the recess.

14. The autonomous cleaner of claim 13, wherein the controller is configured to sense whether the bumper is moved inward based on a time between the light being irradiated and the reflection of the light being detected by the light sensor.

15. The autonomous cleaner of claim 13, wherein the opening is formed in front of the roller.

16. The autonomous cleaner of claim 13, wherein the bumper includes:
   a bumper body mounted to the cavity; and
   a bumper extension that extends backward from the bumper body, and a portion of the bumper extension is configured to enter the recess by passing through the through-hole when the bumper is moved inward.

17. The autonomous cleaner of claim 16, wherein when the bumper has not been moved inward, a part of the bumper extension is provided in the through-hole.

18. The autonomous cleaner of claim 13, wherein the opening of the recess is formed at an inclination surface that is upward inclined with respect to a bottom surface of the cleaner body.

19. The autonomous cleaner of claim 13, wherein the cliff sensor is configured to detect one of a first state in which the bumper is moved inward by the external force into the recess to at least partially cover the cliff sensor, a second state in which a floor surface supporting the cleaner body is positioned below the opening, or a third state in which terrain lower than the floor surface is below the opening.

20. The autonomous cleaner of claim 19, wherein the controller is configured to control the one or more driving wheels according to whether the first, the second, or the third state is detected.

* * * * *